United States Patent [19]

Tsuge

[11] 4,402,493
[45] Sep. 6, 1983

[54] VEHICLE HEIGHT ADJUSTING DEVICE
[75] Inventor: Kazuo Tsuge, Yokohama, Japan
[73] Assignee: Tokico Ltd., Kanagawa, Japan
[21] Appl. No.: 351,365
[22] Filed: Feb. 23, 1982

Related U.S. Application Data

[63] Continuation of Ser. No. 142,163, Jun. 14, 1980, abandoned.

[30] Foreign Application Priority Data

| Apr. 19, 1979 | [JP] | Japan | 54-52364 |
| Aug. 20, 1979 | [JP] | Japan | 54-114311 |
| Aug. 20, 1979 | [JP] | Japan | 54-114312 |
| Aug. 20, 1979 | [JP] | Japan | 54-114317 |

[51] Int. Cl.$^3$ .............................................. F16F 9/04
[52] U.S. Cl. .................................. 267/64.21; 55/337; 55/DIG. 17; 92/79; 267/64.16; 280/711; 280/714
[58] Field of Search ............. 267/64.16, 64.19, 64.21, 267/64.23, 64.24, 64.27; 55/337, DIG. 17; 280/711, 714; 92/79

[56] References Cited

U.S. PATENT DOCUMENTS

| 2,912,254 | 11/1959 | Harry | 280/711 |
| 2,917,320 | 12/1959 | Bohnhoff et al. | 280/711 |
| 3,339,350 | 9/1967 | Sims | 55/337 X |
| 3,667,775 | 6/1972 | Whelan | 267/64.16 X |
| 3,866,895 | 2/1975 | Schultz | 267/64.16 |
| 3,881,743 | 5/1975 | Whelan | 267/64.19 X |
| 3,890,122 | 6/1975 | Frantz | 55/337 X |
| 4,017,278 | 4/1977 | Reese | 55/337 X |
| 4,327,936 | 5/1982 | Sekiguchi | 280/711 |

FOREIGN PATENT DOCUMENTS 238678 11/1945 Switzerland ......................... 55/337

Primary Examiner—George E. A. Halvosa
Attorney, Agent, or Firm—Wenderoth, Lind & Ponack

[57] ABSTRACT

A vehicle height adjusting device includes a source of pressurized air, and an elevating device receiving the pressurized air from the source to change the overall length thereof, thereby changing the height of a vehicle. A drain separator is connected between the source of pressurized air and the elevating device, and an exhaust valve is connected to a drain port of the drain separator and selectively connects the drain separator with the atmosphere. A water collective filter element such as glass wool or the like is contained in the drain separator.

1 Claim, 7 Drawing Figures

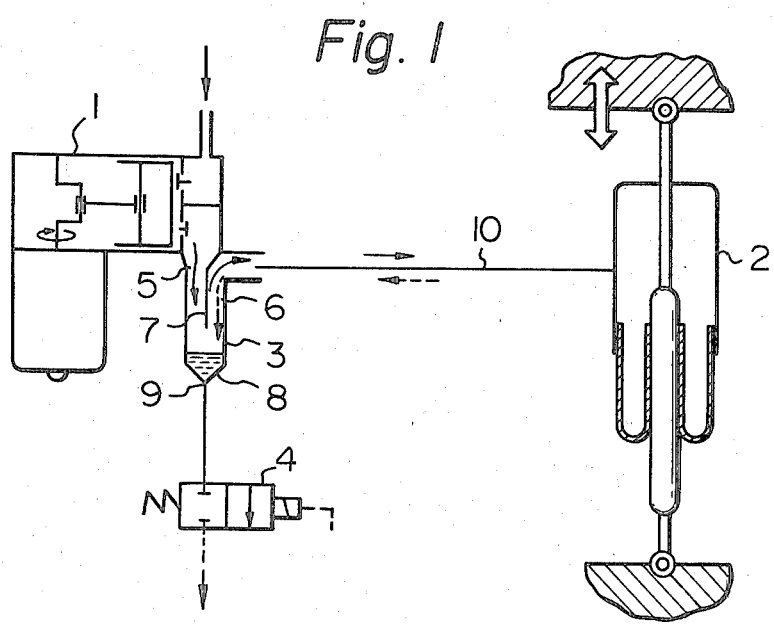
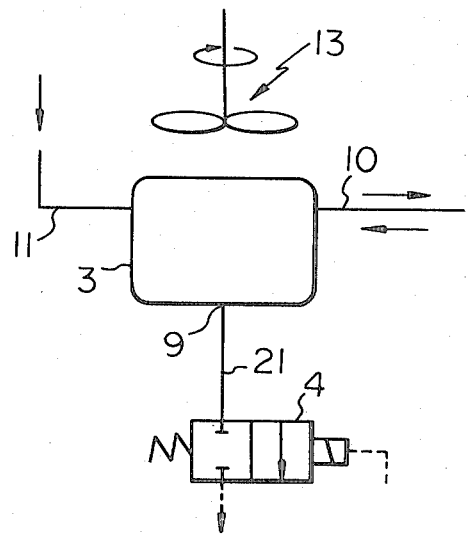

VEHICLE HEIGHT ADJUSTING DEVICE

This is a continuation of application Ser. No. 142,163, filed June 14, 1980, now abandoned.

BACKGROUND OF THE INVENTION

This invention relates to vehicle height adjusting devices of the kind including a source of pressurized air, and an elevating device receiving the pressurized air from the source for elevating or lowering a body of a vehicle.

Conventionally, a drain separator or a dehumidifying or dehydrating device is disposed between the source of pressurized air and the elevating device so as to prevent the elevating device from the accumulation of water which would impair the operational characteristics of the elevating device and induce corrosion.

One previous drain separator contains therein a desiccant such as silica gel or the like whereby the water in the pressurized air is absorbed by the desiccant. The drain separator is simple in construction and compact in size. In elevating the height of the vehicle, the pressurized air is supplied from the source, through the drain separator, to the elevating device. In descending or lowering the vehicle body, a portion of the pressurized air in the elevating device is released to the atmosphere. For selectively connecting the elevating device with the atmosphere, a switching valve is connected to the drain separator such that the pressurized air in the elevating device is released to the atmosphere through the drain separator, whereby a portion of water absorbed in the desiccant will be released therefrom and the dehydrating power of the desiccant will partly be restored.

However, the dehydrating power of the desiccant cannot essentially be restored by simply reciprocating the air and it has been required to exchange or replace the desiccant at a predetermined time interval. Further, there is another problem in that the desiccant will dissolve into powder which will be carried to valves, pipings or the like, thereby clogging them.

SUMMARY OF THE INVENTION

The present invention provides a vehicle height adjusting device incorporating a drain separator which is simple in construction and which solves the problems aforementioned.

The vehicle height adjusting device according to the invention comprises a source of pressurized air, an elevating device receiving the pressurized air from the source to change the height of a vehicle body, a drain separator connected between the source of pressurized air and the elevating device, and an exhaust valve connected to a drain port of the drain separator and selectively connecting the elevating device with the atmosphere.

BRIEF DESCRIPTION OF THE DRAWINGS

The invention will now be further described with reference to the accompanying drawings which are illustrative of preferred embodiments of the present invention, in which:

FIG. 1 is a schematic view of a vehicle height adjusting device according to the invention;

FIG. 2 is a schematic view of a modified drain separator adapted for use in the vehicle height adjusting device of FIG. 1;

DESCRIPTION OF THE PREFERRED EMBODIMENTS

Figure 3:
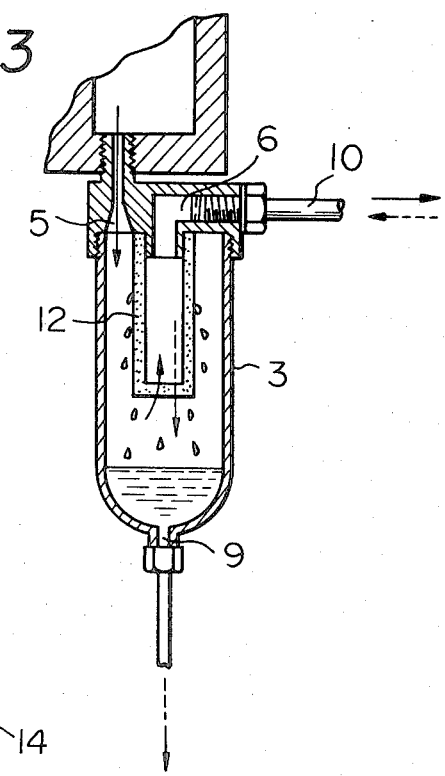
FIG. 3 is a sectional view of a further modified drain separator.

The vehicle height adjusting device illustrated in FIG. 1 comprises a source of pressurized air 1, an elevating device 2, a drain separator 3 interposed between the source 1 and the elevating device 2 and an exhaust valve 4.

The drain separator 3 acts as a dehydrating device and includes an air inlet 5 connected to the source of pressurized air 1, an outlet 6 connected to the elevating device 2 through a piping 10, a partitioning member 7 partitioning the inlet 5 and the outlet 6, a drain collecting portion 8 provided in the lower portion of the separator 3, and an exhaust opening 9 provided in the lower end of the drain collecting portion 8. The exhaust valve 4 is connected with the exhaust opening 9.

The exhaust valve 4 is a two-way valve for selectively closing or opening the opening 9. The valve 4 normally intercepts the communication between the drain separator 3 and the atmosphere, and, when actuated, releases the pressurized air in the drain separator 3 and the elevating device 2. Preferably, the valve 4 is an electro-magnetically actuating or pilot pressure responsive valve so that the valve 4 operates automatically in connection with the elevating device 2, but the valve 4 may be a manually operated valve. Further, the valve 4 may be a control valve of any desired type wherein the pressure in the system can be controlled as desired.

In elevating the vehicle body, the valve 4 is closed, and the pressurized air from the source 1 of pressurized air is introduced into the drain separator 3 through the inlet port 5. The pressurized air is cooled by contacting the inner wall of the separator 3 generating the drain, and the drain will be collected into the drain collecting portion 8. The pressurized air thus dehydrated is supplied through the outlet port 6 and the piping 10 to the elevating device 2. In descending or lowering the elevating device 2 the valve 4 is actuated to be opened. The pressurized air in the elevating device 2 is released to the atmosphere with the drain collected in the drain collecting portion 8 being blown out of the drain separator 3.

In the embodiment shown in FIG. 2, a cooling fan 13 is provided to forcibly cool the outside surface of the drain separator 3. In this embodiment, the cooling fan 13 is not provided to exclusively cool the drain separator 3 and a cooling fan for cooling such as engine radiator or the like is utilized to cool the drain separator 3. The drain separator 3 is connected to the source of pressurized air (not shown) through a piping 11 so that the drain separator 3 is located at any suitable position.

FIG. 3 shows a further modified drain separator in which the interior of the drain separator is partitioned into inner and outer chambers by a generally cylindrical partition 12 which is formed of porous material such as sintered metal, meshed wire or the like which can effectively cool the pressurized air passing through the partition 12 and, also, can effectively collect water droplets. The water droplets collected in the partition 12 will easily be released therefrom and exhausted to the atmosphere when the valve 4 is opened to cause the pressurized air to flow in the direction of the arrows illustrated in broken lines.

Figure 4:
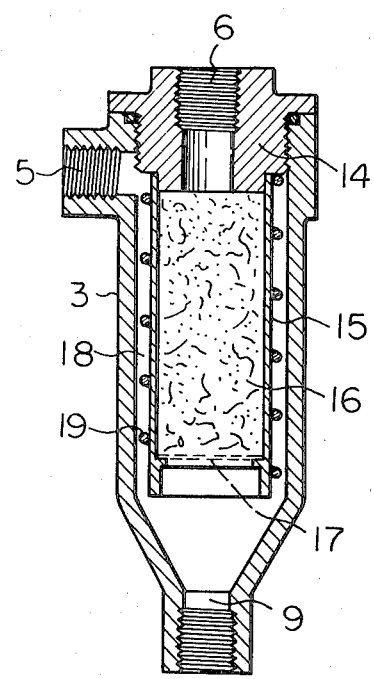
FIG. 4 is a sectional view of another drain separator.

FIG. 4 shows a still further modified drain separator wherein a generally cylindrical filter casing 15 is coaxially disposed in a housing of the drain separator 3. Filter element 16 formed of a water-droplet collecting material such as glass wool or the like is contained in the filter casing 15. A retaining member 17 formed of a porous plate, meshed wire or the like is provided on the open, bottom end of the filter casing 15 for retaining the filter element 16 in position. A similar retaining member may be provided in the upper end of the filter casing 15. A helical member 19 formed of such as a coil spring or the like is disposed in the annular space defined on the outer circumference of the filter casing 15, whereby a helical passage 18 is formed for the pressurized air supplied through the inlet port 5 into the drain separator 3. The pressurized air passing through the helical passage 18 obtains a sufficiently high rotational speed so that large sized water particles, dust or the like contained in the pressurized air will be urged against the inner peripheral wall of the separator 3 due to the cyclone effect and thereby will be removed from the air stream. Pressurized air still containing minute water particles therein will be introduced into the filter casing 15, and such water particles will attach onto and be retained by the filter element 16.

The water particles removed from the air stream and attached onto the inner peripheral wall of the drain separator will flow downwards to form the drain. The drain in the drain separator 3 and water particles collected by the filter element 16 will be blown out of the drain separator 3 when the exhaust valve 4 (FIG. 1) is actuated to decrease the height of the vehicle.

In this embodiment, the pressurized air introduced into the drain separator 3 passes through the helical passage 18, and thus, a relatively large cyclone effect can be obtained even when the quantity of pressurized air introduced into the drain separator is not large and, further, the pressurized air can be cooled amply since the length of the flow passage can be increased.

It is advantageous to form the helical passage 18 by a coil spring 19 which may be a standardized article. However, the helical passage 18 may be formed of any desired means.

Figure 5:
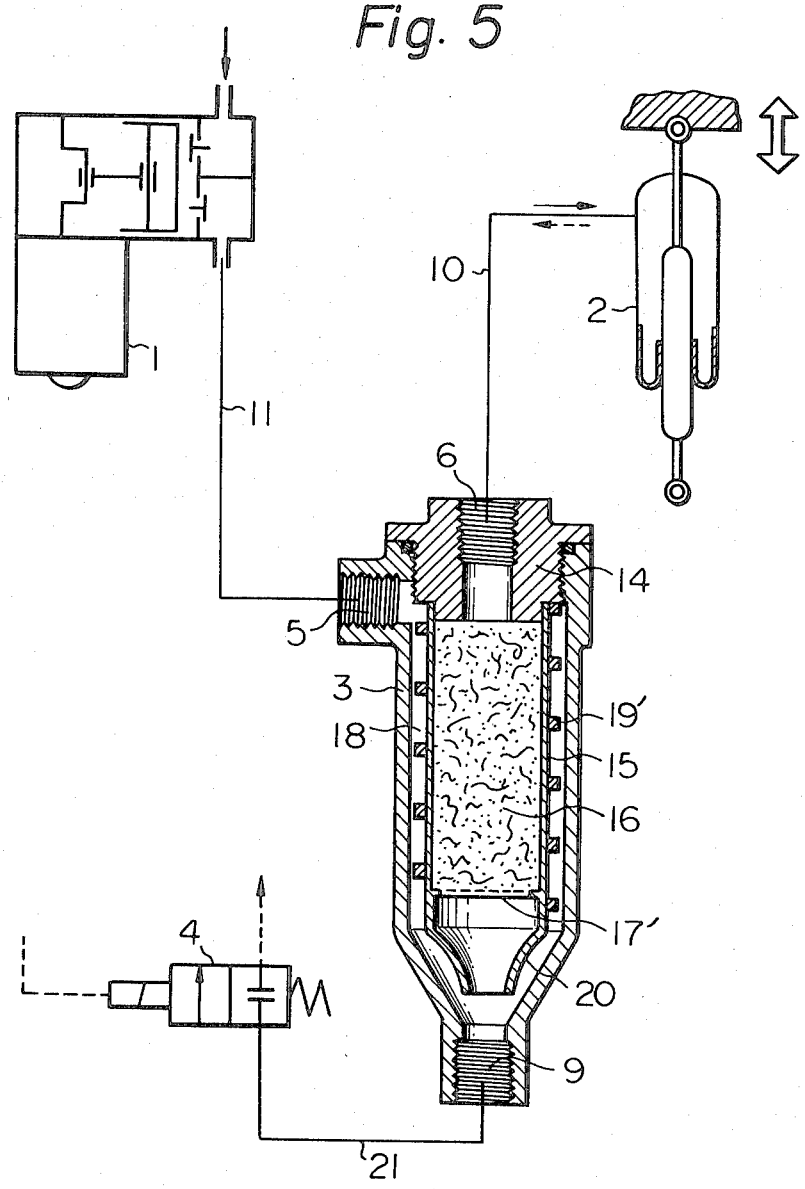
FIG. 5 is a schematic view of a further modified vehicle height adjusting device according to the invention.

The drain separator incorporated in the embodiment illustrated in FIG. 5 is generally similar to the embodiment of FIG. 4. In the drain separator of FIG. 5, the helical passage 18 is formed by a helically formed plate or rod like member 19' encircled around the outer circumference of the filter casing 15, and the lower open end of the filter casing 15 is tapered in the downward direction, whereby the separation of water particles from the air flow can be performed effectively. Further, water particles collected on the filter element 16 can effectively be removed from the filter element and exhausted to the atmosphere when the exhaust valve 4 is actuated.

Figure 6:
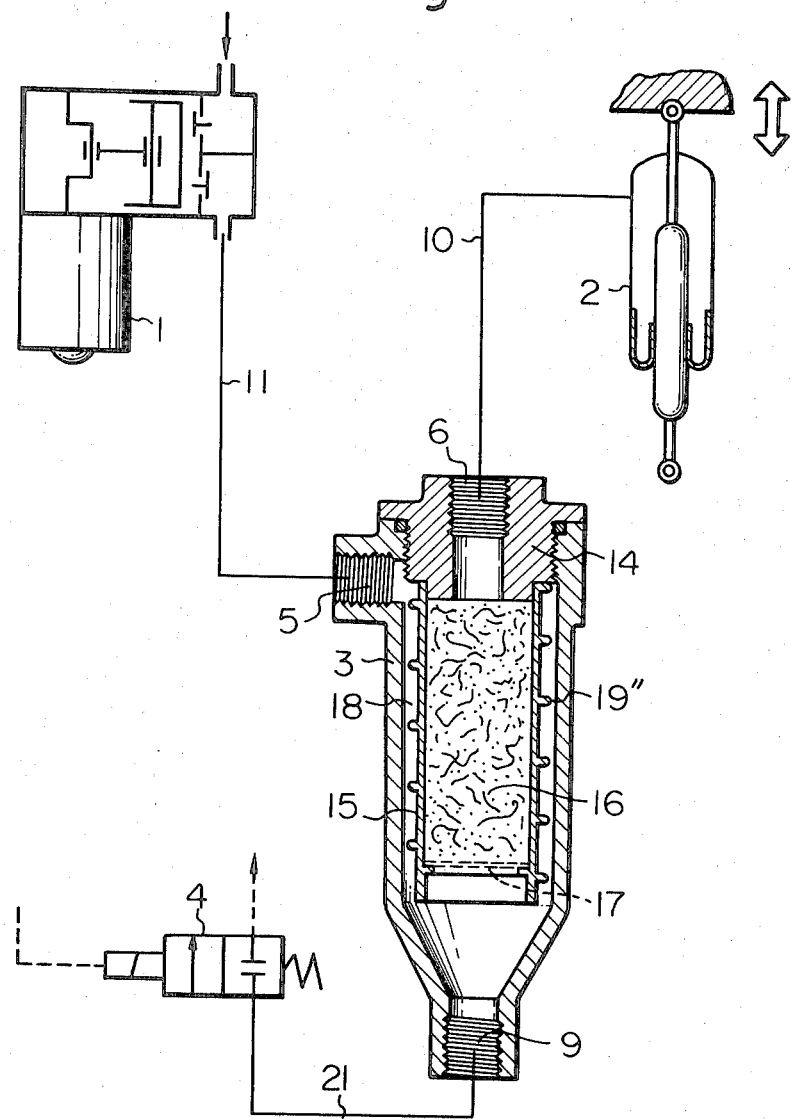
FIG. 6 is a view similar to FIG. 5 but showing a still further modified form of the invention.

The embodiment shown in FIG. 6 is generally similar to the embodiments of FIGS. 4 and 5. In this embodiment a fin-like member 19'' is integrally formed on the outer circumference of the filter casing 15 to define a helical passage 18 in the annular space connected to the inlet port 5 of the drain separator 3.

Figure 7:
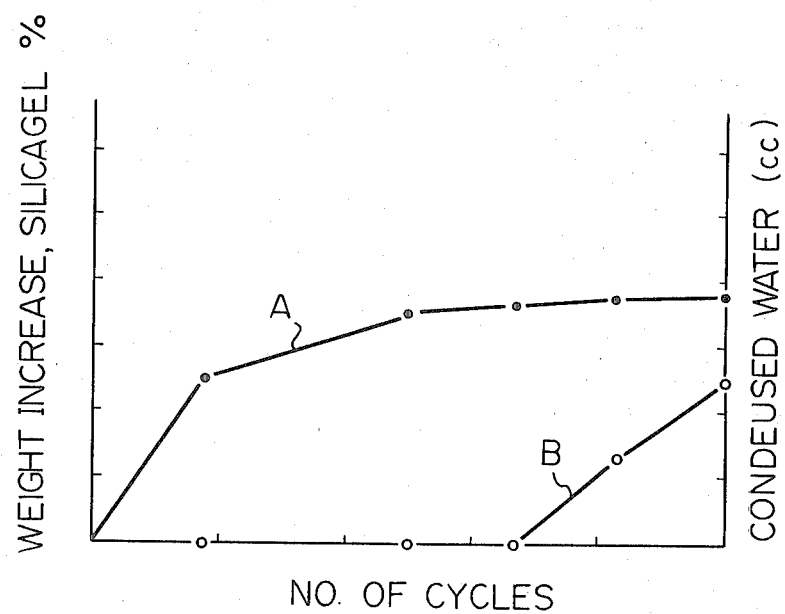
FIG. 7 is a diagram showing the characteristics of a drain separator utilizing silica gel.

FIG. 7 is a characteristic diagram of a typical prior art drain separator containing dehydrating agents such as silica gel. The abscissa shows the number of cycles wherein pressurized air is supplied firstly into a closed container through the drain separator and, thereafter, the pressurized air is exhausted from the container passing through the drain separator in the opposite direction. When the number of cycles is low, or the silica gel is new, the water in the pressurized air will effectively be absorbed thereby increasing the weight of silica gel. Therefore, any water will not condense in the container. In exhausting the pressurized air from the container, a part of the water absorbed in the silica gel will be freed therefrom, but the dehydrating power of the silica gel cannot fully be restored by such simple reciprocation and, accordingly, when the number of cycles increases, the water absorbed by the silica gel decreases and, water not absorbed by the silica gel will condense in the container making a drain.

According to the invention, the filter element contained in the drain separator is of water collective material such as glass wool or the like, thus, and water particles collected by the filter element can easily be removed therefrom and exhausted to the outside of the drain separator when the pressurized air supplied into the elevating device 2 is exhausted by opening the exhaust valve 4.

As described heretofore, the vehicle height adjusting device according to the invention incorporates a drain separator not utilizing desiccant such as silica gel, whereby the dehydrating power of the drain separator can be maintained during a long period of usage, whereby the characteristics of the height adjusting device can reliably be maintained.

What is claimed is:

1. A vehicle height adjusting device comprising:
an air compressor having an inlet for drawing in atmospheric air and an outlet for delivering pressurized air;
a drain separator including a cylindrical housing having in an upper portion thereof an inlet port connected to said outlet of said air compressor for receiving air therefrom and an outlet port, said cylindrical housing having in a lower portion thereof water collecting means and a water drain port, an imperforate filter casing coaxially disposed in said housing and defining therebetween a helical passage, said casing having extending therethrough a coaxial central bore having an upper end opening into said outlet port and a lower end opposing said drain port, and a water collective filter element such as glass wool or the like positioned within said central bore between said upper and lower ends thereof for separating water from the pressurized air received from said air compressor;
an elevating device connected to said outlet port for receiving therefrom pressurized air to elevate the height of a vehicle;
electromagnetically actuated exhaust valve means, connected to said drain port and actuatable between a first position closing said drain port and a second position opening said drain port, for when in said first position allowing said pressurized air to pass through said outlet port to said elevating device and thereby to elevate a vehicle, and for when in said second position exhausting pressurized air from said elevating device through said outlet port, said filter element and said drain port and exhausting water in said collecting means through said drain port, thereby to lower the height of the vehicle; and said lower end of said casing being tapered downwardly and inwardly and defining nozzle means for, when said valve means is in said second position thereof, facilitating the removal from said filter element of water collected therein and enabling exhausting of such removed water through said drain port.

* * * * *

UNITED STATES PATENT AND TRADEMARK OFFICE
CERTIFICATE OF CORRECTION

PATENT NO. : 4,402,493
DATED : September 6, 1983
INVENTOR(S) : Kazuo TSUGE

It is certified that error appears in the above—identified patent and that said Letters Patent is hereby corrected as shown below:

On the Abstract Page:

Change "[63]   Continuation of Ser. No. 142,163, Jun. 14, 1980, abandoned."

To --[63]   Continuation of Ser. No. 142,163, Apr. 14, 1980, abandoned.--

Signed and Sealed this

Sixth Day of March 1984

[SEAL]

Attest:

GERALD J. MOSSINGHOFF

Attesting Officer    Commissioner of Patents and Trademarks